United States Patent [19]

Queveau

[11] Patent Number: 4,664,437
[45] Date of Patent: May 12, 1987

[54] HATCHBACK DOOR WITH OPTIONALLY STATIONARY WINDOW

[76] Inventor: Gerard Queveau, Amik-Farm, Les Boulaies, Le Pin 79140, Cerizay, France

[21] Appl. No.: 858,219

[22] Filed: Apr. 30, 1986

[30] Foreign Application Priority Data

Apr. 30, 1985 [FR] France ............... 85 06600

[51] Int. Cl.⁴ ............... B60J 1/18; B60J 5/10
[52] U.S. Cl. .................. 296/146; 296/76; 296/106; 49/163
[58] Field of Search .............. 296/51, 56, 76, 106, 296/146, 201; 49/62, 65, 163, 169, 170

[56] References Cited

U.S. PATENT DOCUMENTS 3,713,472  1/1973  Dozois ............... 296/56
4,413,854  11/1983  Hirshberg ............ 296/146

FOREIGN PATENT DOCUMENTS 0146420  11/1981  Japan ............... 296/56

Primary Examiner—Robert B. Reeves
Assistant Examiner—Dennis H. Pedder
Attorney, Agent, or Firm—Leydig, Voit & Mayer

[57] ABSTRACT

A hatchback-type door assembly for a vehicle has a door subassembly hinged to the vehicle and a window subassembly separately hinged to the vehicle, the hinge axis of the door subassembly and the window subassembly coinciding with one another, whereby the door subassembly may be pivotally opened while the window subassembly remains closed or, alternatively, the window and door subassemblies may be opened in unison.

9 Claims, 11 Drawing Figures

HATCHBACK DOOR WITH OPTIONALLY STATIONARY WINDOW

The invention relates to vehicles, especially automobiles, and more specifically to a vehicle door comprising a door which pivots relative to the vehicle body and a window which can either pivot with the door or remain stationary.

Presently, automobile vehicles in which the trunk is in communication with the interior passenger compartment enjoy an increasing popularity. This type of vehicle, typically comprising a rear door commonly known as a "hatchback" articulated around a horizontal shaft at the top rear of the vehicle, presents the advantage of allowing, when needed, significant cargo space simply as a result of removing or folding down a rear shelf which is typically located beneath window and above the trunk space. Very often, vehicles of that type are also fitted with a rear seat back which can also be folded down or removed entirely, to further increase the available cargo space.

Most of the hatchback type vehicles unfortunately present a serious drawback: access to trunk space often requires the opening of the entire hatch door, causing the passenger compartment to be opened to the outside. Thus, when the temperature is either very low or very high, the passengers in the vehicle are subjected to sudden and uncomfortable temperature variations, and they may also be subjected to wind, rain and other inclement weather. Such problems are not encountered with classical vehicles having a separate, isolated trunk the lid of which may be opened without effect on the interior of the car.

U.S. Pat. No. 4,413,854 discloses hatchback door arrangements which permit only the rear deck lid to be opened, but the arrangements call for a hinge axis between the window and the deck lid. This not only complicates the overall design and sealing requirements, but also restricts the contouring of the window and deck lid in the immediate area of the hinge axis.

The present invention has as its purpose to remedy the drawbacks with conventional hatchback-type doors and those described in the referenced patent and, to that end, it relates to a vehicle door comprising a door subassembly (hereinafter sometimes simply the "door") which pivots relative to the interior, and an independently pivoting window subassembly (hereinafter sometimes simply the "window") which may either remain in place while the door opens or may open in unison with the door. To permit these two modes of operation, the geometric axes for the pivoting of the door subassembly and for the pivoting of the window subassembly preferably coincide. In addition, at least one latch is provided for selectively connecting and disconnecting the window pane from the door, along with an actuation mechanism for the latch, such that the door and the window may be selectively maneuvered together or separately.

By means of such a design, the user is offered the option of opening only the door while leaving the window in place. In this manner, the load compartment may be accessed while maintaining the interior practically closed.

The invention will be better understood and other objects and advantages will become apparent by reference to the description of illustrative preferred embodiments which follows. These embodiments are shown in the attached drawings in which:

FIGS. 1 and 2 schematically represent side views of a vehicle equipped with a door according to the invention. In FIG. 1 both the door subassembly and the window subassembly are in the open position; in FIG. 2 the door subassembly alone is open, with the window subassembly remaining in the closed position.

FIG. 3 schematically shows, in perspective, a rear view of the vehicle shown in FIGS. 1 and 2.

FIG. 5A is a view of the latch members in the direction of arrow 5A in FIG. 5, the door itself not being represented.

FIG. 5B is a view in the direction of arrow 5B in FIG. 5.

Figure 1:
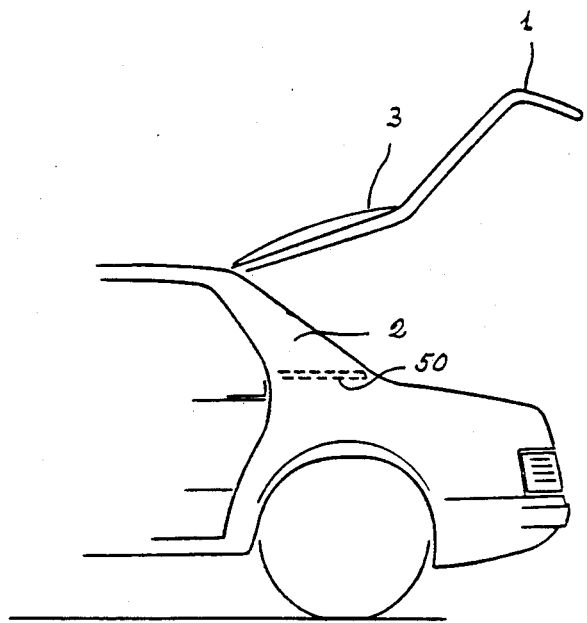
Figure 2:
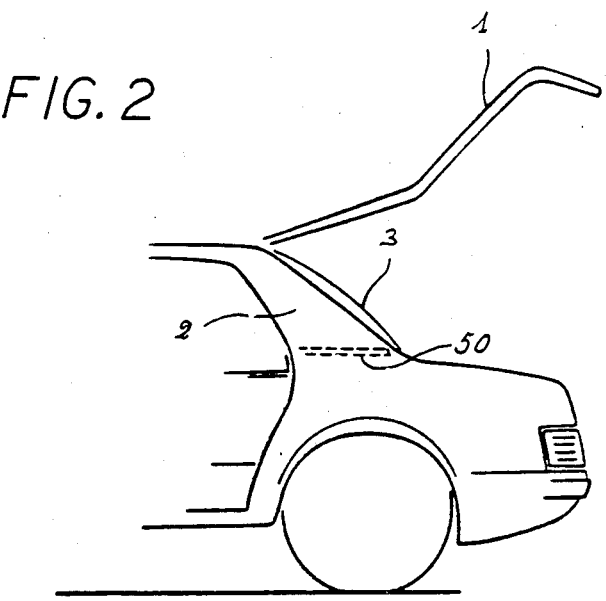
Figure 3:
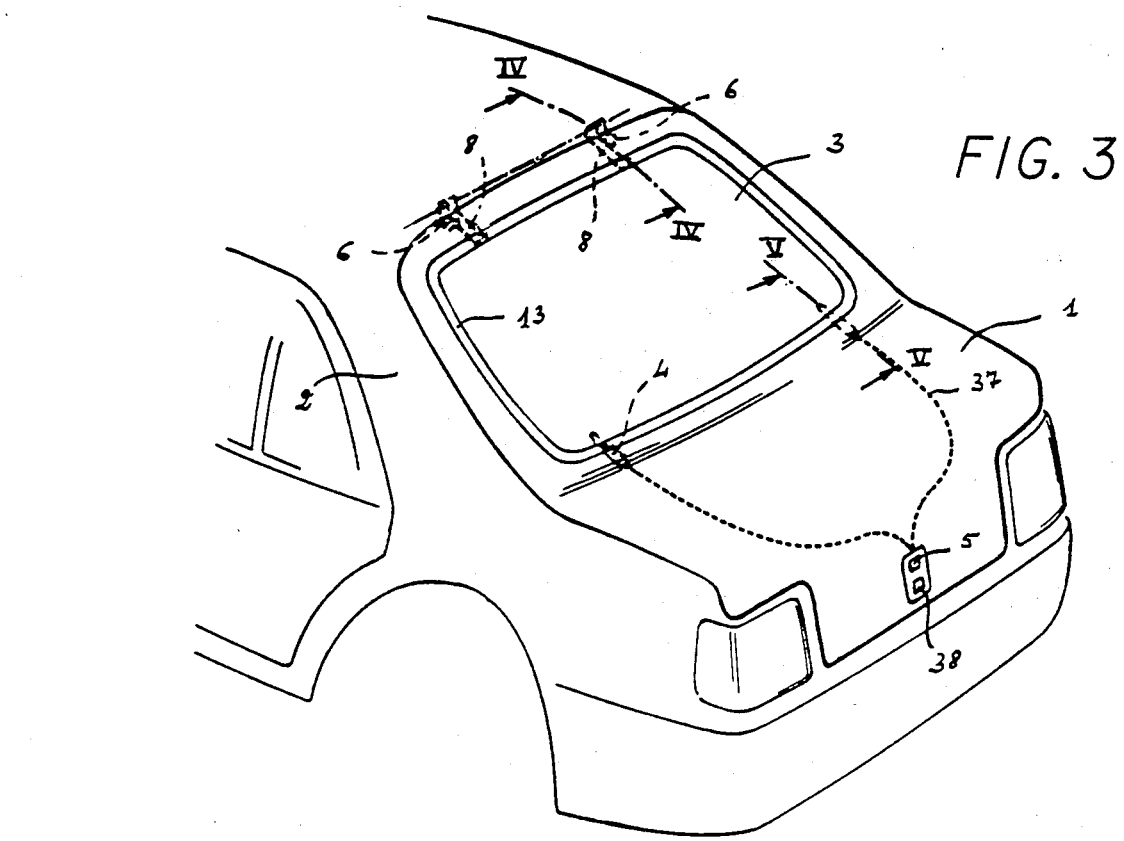

Generally speaking, the drawings show a vehicle door, of the rear hatchback type, comprising a door subassembly 1 which pivots relative to the vehicle body 2, and a window subassembly 3, suited to permit a pivoting relative motion between window subassembly 3 and door subassembly 1.

To that end, window subassembly 3 itself is mounted in a pivoting manner relative to the vehicle body 2, and in the embodiment shown the geometric axes about which the door subassembly 1 and the window subassembly 3 pivot coincide. In addition, there is provided at least one, and preferably two, latches 4 which selectively connect the window subassembly 3 to door subassembly 1. A latch operator 5 selectively connects or disconnects the window subassembly from the door subassembly so that the door subassembly may be opened either separately or in unison with the window subassembly.

Figure 4:
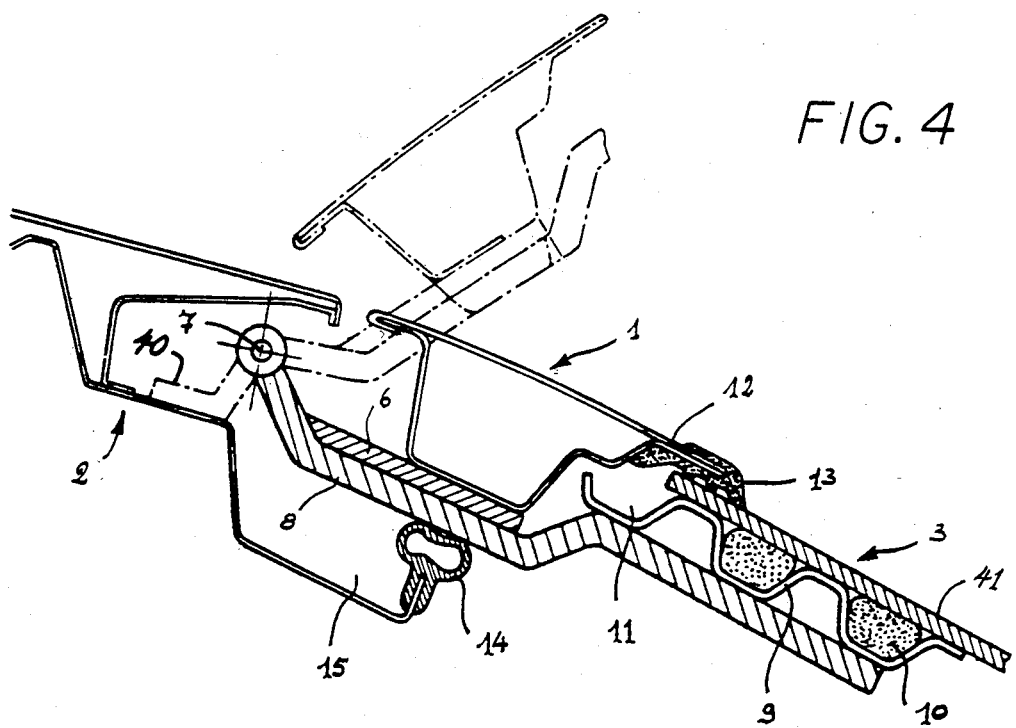
FIG. 4 is a sectional view, along line IV—IV in FIG. 3, which shows a cross section of the door in the articulations area.

As best shown in FIG. 4, door subassembly 1 is connected to the vehicle body 2 by means of two hinge-forming devices. The hinge-forming devices constitute a pivoting arm 6 affixed to the door subassembly, said pivoting arm 6 rotating around a shaft 7 carried by bracket 40 affixed to the upper rear part of the opening of the vehicle.

In the same manner, the window subassembly 3 is connected to the interior by means of a hinge equipped with an arm 8 which pivots around the same shaft 7. Depending upon the strength and configuration of the glass pane 41, the bracket 8 may be adhered directly to the glass pane, or to an optional frame to which the glass pane is mounted. In the embodiment shown, the pivoting arm 8 is affixed to a frame 9 which surrounds glass pane 41. The cross section of frame 9 is a succession of several isosceles trapezoids, with the bases constituting one face of the frame being placed against the glass pane 41 and the bases constituting the opposite face being affixed to the arm 8 of the hinge, as, for example, by welding. Adhesion between frame 9 and glass pane 41 is obtained by the use of adhesive 10, which may substantially fill one or more of the isosceles trapezoids that opens facing the glass pane 41. The frame 9 is placed in such a manner that the top trapezoid 11, relative to the periphery of glass pane 41, will be open and facing the glass pane and extend slightly beyond its top edge as to form a gutter.

Preferably, door subassembly 1 and window subassembly 3 are connected to the vehicle body by two hinges, the shaft 7 being formed by either a single hinge pin or by separate, aligned hinge pins. It will be appreciated that, according to an important aspect of the invention, the single hinge axis not only permits the door and window to operate in unison or separately, but also permits the contouring of the other portions of the window and door subassemblies, since the only requirement for linearity is along the single hinge axis 7.

Figure 5:
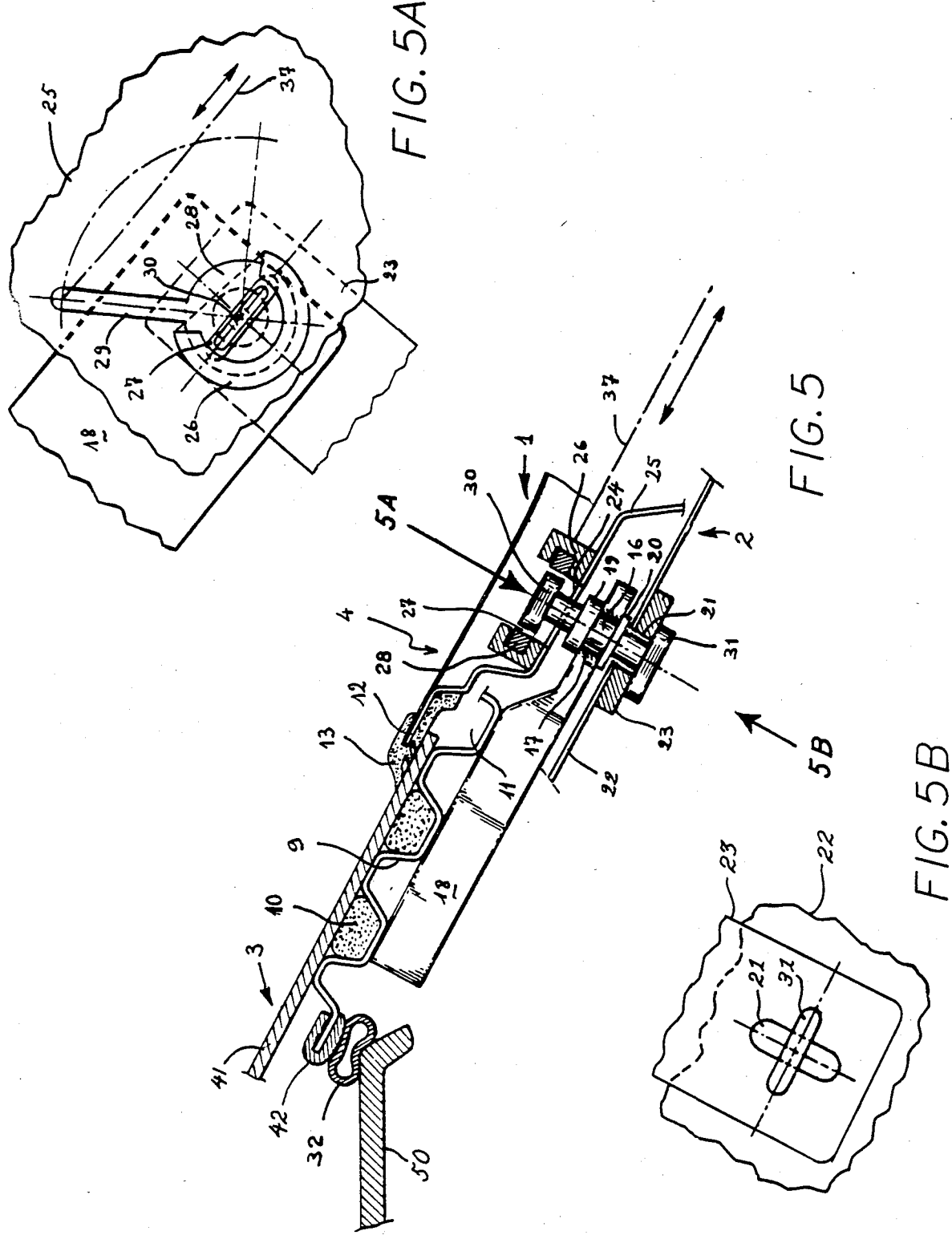
FIG. 5 is a sectional view along line V—V in FIG. 3, which shows a cross section of the door in the area of the locks.

FIG. 5 shows the details of the latching mechanism 4 which selectively causes the window subassembly 3 to operate in unison with the door subassembly 1. Although only one interlocking latch is necessary, it is preferable to have two of them.

In the embodiment illustrated, the latches 4 each comprise a rotatable stud 16 held captive in a hole 17 of a bracket 18 fixed to the window subassembly 3. The bracket 18 is shown mounted on the lower portion of window subassembly 3 as shown in the figures and, hence, opposite to the side of the window subassembly which is hinged to the opening of the vehicle's body. The stud 16 is immobilized relative to bracket 18 in its longitudinal direction by means, for example, of a flange 19 provided on said stud on one side of the bracket, and a washer 20 fixed to the stud set on the other side of the bracket.

In the embodiment shown, stud 16 projects beneath bracket 18, through an opening 21 made through the vehicle body, as for example, a hole through the sheet metal 22 of the body and/or a reinforcement member 23 affixed to said body.

On the other side of bracket 18, stud 16 also projects through an opening 24 made in a sheet metal part 25 of the door subassembly and through a ring segment 26 affixed to said sheet metal part 25, as well as through an opening 27 of a rotatable disk 28. The disk is captured in ring 26, which in turn is affixed to sheet metal part 25. As shown in FIG. 5A, the ring 26 is open along an arc slightly larger than 90° so as to permit a free motion, over about 90°, of an integral finger 29 which extends in a radial direction relative to disk 28, the function of which will be explained below.

Opening 27 of disk 28 is oblong in shape and it receives the similarly shaped, slightly smaller head 30 of stud 16. The opening 24 in the sheet metal 25 and the opening in the base of ring 26 are also oblong in shape, slightly larger than head 30. The head 30 may be a separate member pegged to the stud 16, or it may be an integral part of the stud. It will be recognized that the action of oblong opening 27 on head 30 of the stud 16, caused by restating the positioning of the disk 28 with integral finger 29, can cause head 30 to either align with, or be substantially orthogonal to, the openings in the sheet metal 25 and the base of the ring 26. As a result, the bracket 18, and hence the window subassembly 3, may be selectively operated along with the door subassembly.

Opening 21 of the reinforcement member 23 also is oblong, and the end of the stud 16 which is opposite the head 30 also comprises an oblong head 31 which either can be a member pegged to stud 16, or an integral part of the latter. As with the head 30, the dimensions of head 31 are slightly smaller than those of the oblong opening 21; the orientation of head 31 relative to the oblong opening 21 being such that, with the finger 29 at one end of its travel, head 31 aligns with opening 21, below the latter, while with finger 29 at the other end of its travel, head 31 is substantially orthogonal to the opening 21.

Hence, with finger 29 in the position shown in FIG. 5, door subassembly 1 can be disengaged from stud 16, while the stud, held by interaction of head 31 with sheet metal piece 22 and reinforcement bracket 23, secures the window subassembly 3 in place relative to the vehicle. With finger 29 in its other (dotted) position, however, head 30 of stud 16 interacts with and engages the base ring 26, while head 31 is disengaged from sheet metal 22 and reinforcement 23, such that window subassembly 3 will open along with the door subassembly.

As shown in various views in FIGS. 3-6, a resilient sealing member 13 is shown around the entire periphery of the opening in the door subassembly 1 which receives the window subassembly 3 to create a weather seal between the two when they are latched relative to one another. As shown best in FIG. 4, the sheet metal of the door subassembly may be configured as a flange 12 to receive the sealing member 13.

Referring to FIG. 5, a resilient sealing member 32 is shown affixed to a flexible channel element 42 which is in turn assembled onto the frame 9. The sealing member 32 rests, when window subassembly 3 is in its closed position, against the rear shelf 50 of the vehicle, to maintain a seal between the lower portion of the window subassembly and the shelf when the former is closed, regardless of whether the door subassembly is open or closed.

Similarly, as shown in FIG. 4, a resilient sealing member 14, shown affixed to a gutter 15 formed as an integral part of the vehicle 2, creates a seal between the bracket 8 and the gutter that is maintained when the window subassembly is closed, again regardless of whether the door subassembly is open or closed.

Figure 6:
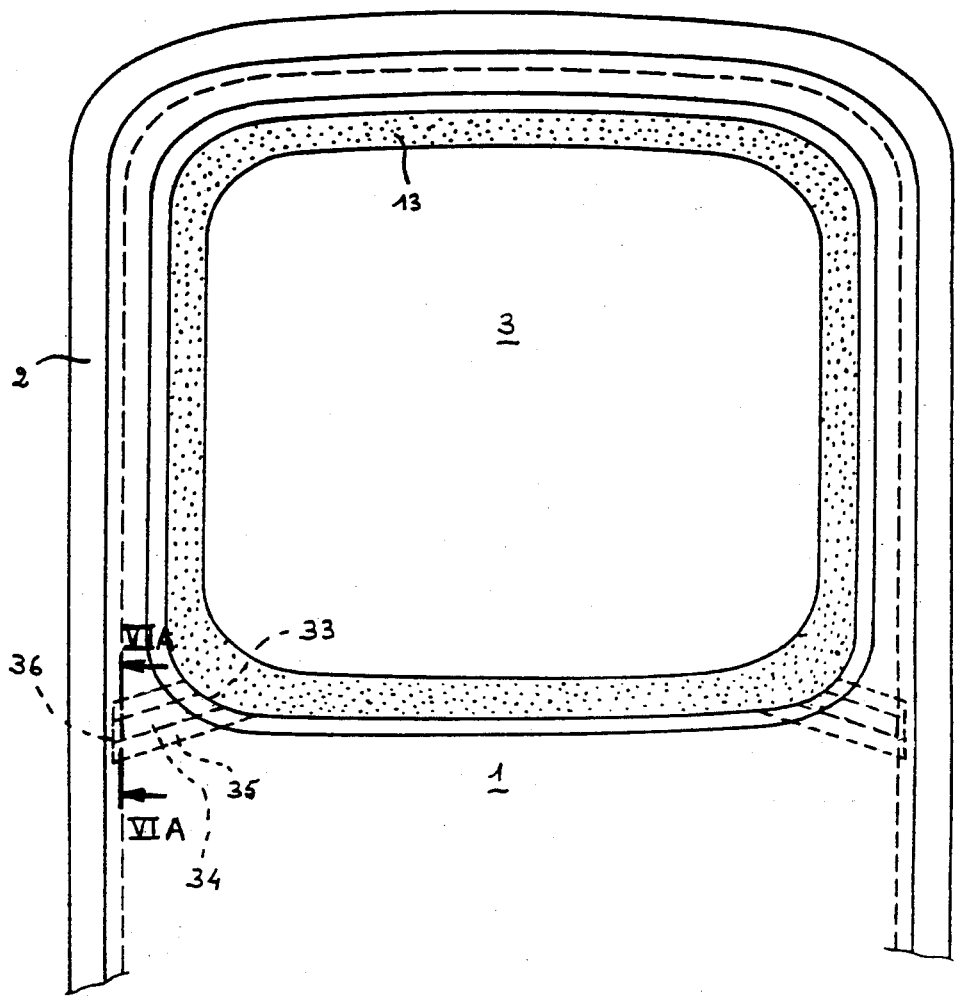
FIG. 6 is a partial rear view of a vehicle having a door according to the present invention.
Figure 6A:
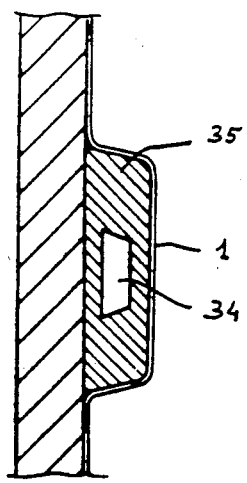
FIG. 6A is a partial sectional view along line VIA—VIA in FIG. 6.

As has already been discussed, frame 9 of window subassembly 3 is shown fitted over its entire periphery with a gutter 11. So as to provide for removal of water from gutter 11, the gutter may be designed to empty into the gutter 15. Referring to schematic FIG. 6, the lower portion of the gutter 11 is shown fitted with two lateral openings 33 which open into a duct 34 of a block 35. The blocks are shown affixed to frame 9. Openings 36 in gutter 15 receive the blocks 35. This drainage arrangement is shown in cross section in FIG. 6A.

Considering now the actuation of the latch mechanism 4, and referring again to FIG. 5a, the free ends of fingers 29 of disk 28 are connected to the latch governing device 5 by means of a conventional linkage which may comprise rigid rods or flexible cables. This rod or cable system is shown schematically as item 37 in FIGS. 3, 5 and 5A.

From the above, it will be appreciated that two modes of actuation are possible for window subassembly 3: the window subassembly may be latched to door subassembly 1, thereby making it possible to raise the latter with window subassembly 3, or the window subassembly may be latched to the body 2 of the vehicle, making it possible to raise the door subassembly alone, with the window subassembly remaining stationary relative to the vehicle.

Summarizing the operation of the hatchback door of the present invention as desribed in detail above, in order to raise the door subassembly and the window subassembly together, the desired option is chosen via the latch actuation mechanism 5. The action on the latch mechanism 5 causes, through the linkage system 37, finger 29 to pivot to the dotted position. This pivoting causes the rotation of the oblong opening 27, which in turn causes the similar rotation of head 30 of stud 16. As a result, the head 30 is blocked by the orthogonal slot in the ring 26 and opening 24 in the sheet metal 25. At the same time, head 31 aligns with opening 21. In this manner, door subassembly 1 and window subassembly 3 are secured to each other and both are free to pivot relative to the vehicle body around the axis of shaft 7. The door may then be unlatched via a conventional lock 38.

In order to raise the door subassembly without the window subassembly, the first action is to operate the latch actuation mechanism 5 in order to release the window subassembly from the door subassembly and secure it to the vehicle body. This is accomplished via the linkage 37 which causes finger 29 to pivot inside ring 26, driving head 30 to a position shown in FIG. 5A, aligned with the oblong opening of the base of the ring 26 and opening 24 in the sheet metal 25. This action shifts head 31 substantially perpendicular to opening 21 in member 23. As a result, bracket 18 is immobilized relative to the vehicle body and door subassembly 1 is freed from stud 16. Door subassembly 1 is then free to pivot around shaft 7 without movement of the window subassembly 3. As before, the door subassembly may then be unlatched from the vehicle using lock 38.

Figure 7:
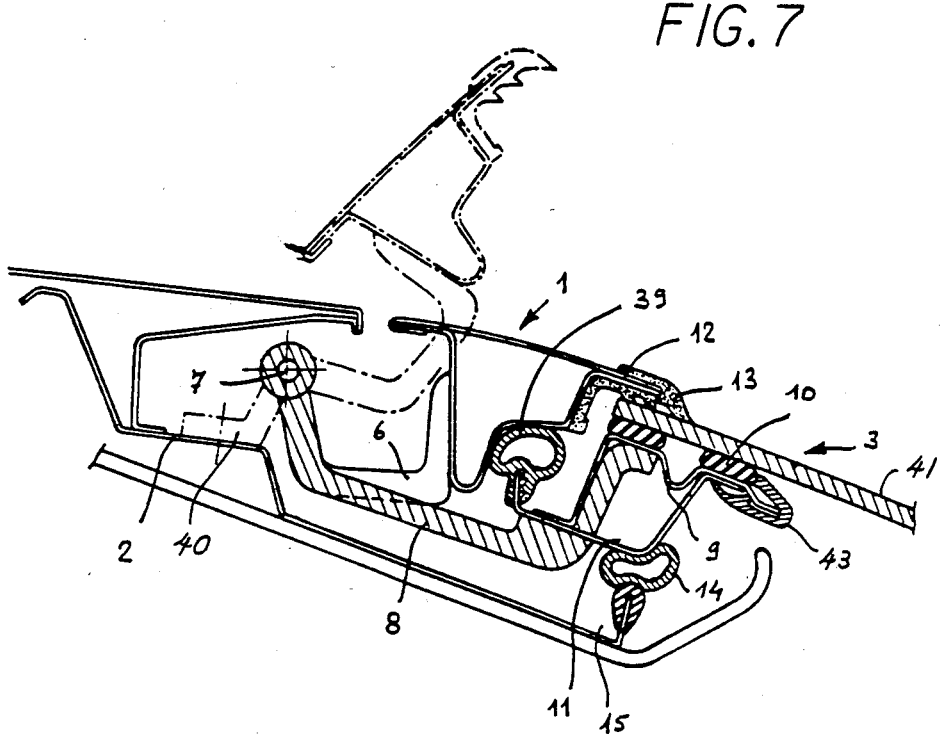
FIG. 7 is a sectional view similar to FIG. 4 of an alternative embodiment of the invention.
Figure 8:
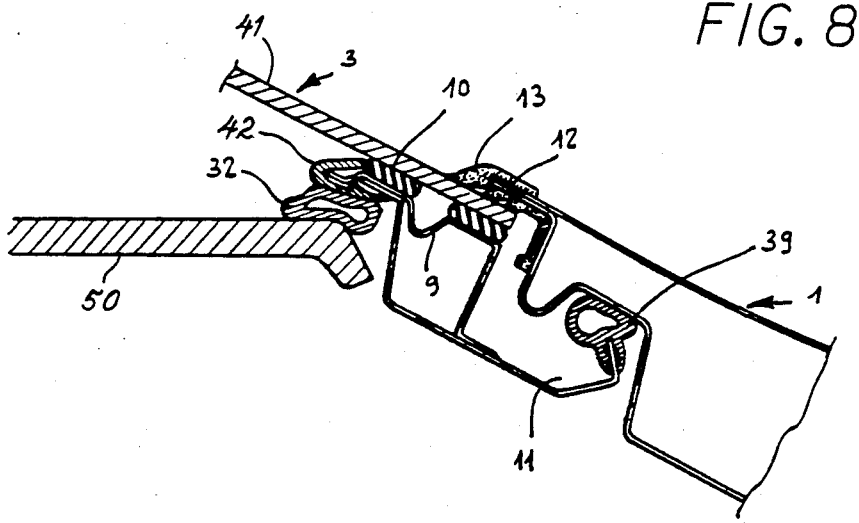
FIG. 8 is a sectional view similar to FIG. 5 of the same alternative embodiment of FIG. 7.

An alternative embodiment of the invention is shown in FIGS. 7 and 8, wherein the corresponding members are designated by the same reference numbers used in FIGS. 1–6. The embodiment of FIGS. 7 and 8 show an alternative window mounting and sealing arrangement. In this embodiment, a resilient sealing member 39 extends around the entire periphery of the window subassembly 3, to seal against the door subassembly 1 around the periphery of the opening therein. Frame 9 is shown as a two piece formed channel adhered to the window subassembly with adhesive 10. An optional, protective, flexible channel 43 is shown covering the flange of frame 9. A gutter 11 is again formed, and the evacuation of water is obtained in the same manner as already described with reference FIGS. 6 and 6A. Latches 4 may be the same as those described previously.

In short, the invention which has just been described is a device which makes it possible either to associate or to dissociate a flat or convex window to or from a movable assembly of a vehicle, such as a hatchback door, to permit either the simultaneous opening of said door with the window, or the opening of said door without the window. In the case of a vehicle with a rear hatchback door, the raising of the door and the window gives access to the rear load space and to the interior of the vehicle. The raising of the hatch door without the window, on the other hand, gives access only to the load area of the vehicle and insulates the interior of the vehicle from the outside. Latches 4 and the latch actuation mechanisms 5 make it possible to choose the door opening option (i.e., with or without the window), while a conventional lock 38 effects the opening after the option has been chosen.

Of course, the invention is not limited to the embodiments that have been described and represented above, and it will be appreciated that other embodiments of the invention may be employed without departing from the spirit and scope of the invention set out in the appended claims. Without limitation, for example, the latches and latch actuating mechanisms may be mechanical, electrical, electromagnetic, pneumatic, oleopneumatic, etc. In addition, the latch activation mechanisms may obviously be located either inside or outside the vehicle, or both.

I claim as my invention:

1. A door assembly for a vehicle comprising a door subassembly hinged to the vehicle and a window subassembly separately hinged to the vehicle and adapted to close an opening in the door subassembly, the hinge axes of the door subassembly and the window subassembly coinciding with one another, latch means to selectively secure the window to the vehicle when said latch means is in a first condition whereby the door subassembly may be pivotally opened while the window subassembly remains secured against pivotable movement and to secure the window subassembly to the door subassembly when the latch means is in a second condition whereby both of said subassemblies may be opened in unison, the latch means comprising latch actuating means to select between the first and second conditions of the latch means.

2. The door assembly of claim 1 wherein it is adapted for mounting to the vehicle as a rear hatchback door with the hinge axis substantially horizontal and transverse to the vehicle at the top rear thereof.

3. The door assembly of claim 1 wherein the window subassembly comprises a glass pane secured to a window frame, the frame being hinged to the vehicle.

4. The door assembly of claim 1 further comprising means for sealing between the door subassembly and the window subassembly.

5. The door assembly of claim 1 further comprising means for sealing between the door subassembly and at least a portion of the vehicle.

6. The door assembly of claim 1 further comprising means for sealing between the window subassembly and at least a portion of the vehicle.

7. The door assembly of claim 6 further comprising means for sealing between the window subassembly and a shelf means separating the vehicle interior from the cargo space.

8. The door assembly of claim 1 wherein the latch actuating means comprises an actuator and a linkage system between the latch actuator and the latch means, whereby the latch actuator can shift the latch means between the first and second conditions.

9. The door assembly of claim 1 wherein the latch means comprises an element rotatably mounted on the window subassembly, the element having first and second heads at opposite ends thereof, the first of the heads being adapted to engage the vehicle, the vehicle having a mating opening through which the first head passes only when aligned therewith, the second of the heads being adapted to engage the door subassembly, the door subassembly having a mating opening through which the second head passes only when aligned therewith, the first and second heads and the openings carried by the vehicle and the door subassembly being oriented such that with the latch means in its first condition the first head is not aligned with the opening carried by the vehicle and the second head is aligned with the opening carried by the door assembly and vice-versa with the latch means in its second condition, whereby, with the latch means in the first condition, the window subassembly will remain in place relative to the vehicle as the door subassembly is opened and, with the latch means in the second condition, the window subassembly and the door assembly will open and close in unison.

* * * * *